United States Patent Office 3,247,102
Patented Apr. 19, 1966

3,247,102
PROCESS FOR THE ELUTRIATION OF DIGESTED SLUDGE
Charles P. Priesing and Stanley Mogelnicki, Midland, Mich., assignors to The Dow Chemical Company, Midland, Mich., a corporation of Delaware
No Drawing. Filed Jan. 13, 1964, Ser. No. 337,152
6 Claims. (Cl. 210—10)

The present invention relates to an improved process for washing digested sewage sludges whereby alkaline materials normally present in such sludges are removed. More particularly, the invention concerns a process for the elutriation of digested sewage sludges utilizing additional organic solids in the form of certain non-digested sewage sludges conjunctively with organic, polymeric flocculants to effect an improved solids-liquid separation during the elutriation operation.

The process of elutriating digested sewage sludges to render them more amendable to dewatering has been described in United States Patent 1,999,973. Briefly the process involves countercurrent aqueous extraction of a digested sewage sludge, primarily for the purpose of removing soluble alkaline materials, such as ammoniacal compounds, and secondarily for the purpose of removing certain insoluble suspended fines. These materials tend to interfere with filtration processes for dewatering the digested sludge and to markedly increase the dose of chemical coagulants such as $FeCl_3$ and lime, normally required to condition the digested sludge solids for filtration.

In practice, the aqueous washing medium may be pure or essentially pure water, but generally it is obtained from the effluent of a primary or secondary sewage clarifier. Influent raw sewage may also be used. The digested sludge and aqueous washing medium are continuously charged to a mixing zone. After suitable mixing has occurred, the treated solids enter a quiescent zone in which settling occurs. The aqueous washing medium, or elutriate at that point, is removed from the elutriator as an overhead stream. The settled solids are withdrawn as a sludge and fed to a filtering train involving sequential chemical conditioning of the washed sludge solids and dewatering of the conditioned solids as by filtration. The overhead stream is usually recycled to one of the processing feed streams of the sewage plant, or it may be discharged to a natural water body or settling pond.

Often, as much as 50 percent of the suspended solids fed to the elutriator are carried over in the overhead. Since the overhead is conventionally recycled, it is manifest that, on an overall basis, the sewage treating plant is handling a substantial amount of recycled solids thereby increasing its load.

It would be desirable to provide a more efficient elutriation process whereby the unnecessary reprocessing of sewage is eliminated. A further desideratum of the art is to provide an improved elutriation process which produces a sludge more amenable to filtration with minimization of chemical coagulant needs to effect dewatering of the sludge. The foregoing, and other benefits as will become apparent hereinafter, are accomplished in the present invention.

As its starting point, the present invention involves the elutriation process as it is presently practiced. This process comprises the steps of feeding a digested sewage sludge to a liquid mixing zone concomitantly with an aqueous washing medium and thereafter settling the washed sewage solids and withdrawing the wash water elutriate as an overhead stream. The invention particularly involves the improvement in the foregoing process which consists in conjunctively (1) feeding a controlled amount of an additive non-digested sewage sludge into the mixing zone and (2) incorporating a sufficient amount of an anionic organic polymeric flocculant into the mixing zone to enhance the rate of solids-liquid separation. The adjective "additive" is applied to the specified non-digested sewage sludges inasmuch as such sludges are not normally in the feed to the mixing zone.

The amounts of the additive sewage sludge and anionic polymeric flocculant blended with the digested sludge and aqueous washing medium will vary for optimum results between relatively narrow limits. To enhance the settling rate of solids in the resulting blend, the amount of the additive sewage sludge used should be controlled to provide from about 5 to about 50 percent by weight additional solids based on the weight of the digested sewage sludge solids, with 10 to 30 percent additional solids being preferred. The amount of the organic polymer flocculant utilized is within the range from about 0.01 to about 10 pounds per ton of the total sewage sludge solids fed to the mixing zone, with from about 0.1 pound to about 1 pound being preferred. The term "solids" refers to the mass of solid materials determined by filtering a given aliquot of the sludge and drying the filter cake at 110° C. for 2 hours. The weight of such dry solids is taken as the solids content of the given aliquot.

Since the elutriation process is usually carried out as a continuous process, the feed streams are fed to the mixing zone at proportioning rates designed to maintain the indicated relative concentrations of the respective types of sewage sludge solids, anionic polymeric floculant and aqueous washing medium in the mixing zone.

While all of the solids to be incorporated in the mixing zone can be added directly thereto, several other modes of addition are possible. One such other mode is to mix the anionic polymeric flocculant with the aqueous washing medium in one stream and the digested sewage sludge with the additive non-digested sewage sludge in a second stream. These two streams are then brought together in the mixing zone, which may be provided, if desired, with mechanical agitating means to induce proper mixing to achieve a uniform blend of all feed streams and flocculation of the suspended solids. After the mixing zone the treated sludge is subjected to quiescent conditions whereby the washed and treated solids are settled.

The described elutriation process may be further specified in terms of the dilution ratio used. This ratio is obtained by dividing the total volume of aqueous liquid added in the forms of the aqueous washing medium, the additive sewage sludge and anionic polymeric flocculant streams by the volume of digested sludge treated, each of the volumes being for a given time period. This ratio will vary for best results according to the concentration of alkaline salts in the digested sewage sludge. Generally, the ratio should be within the range from about 1/1 to about 15/1, preferably within the range from about 2/1 to about 8/1.

The digested sewage sludge processed in accordance with the present invention is any sewage sludge which has been subjected to anaerobic conditions for an extended period whereby the sludge solids are partially decomposed. Such sludges will be distinctively characterized by the large amounts of ammoniacal compounds dissolved therein.

The additive non-digested sewage sludges comprise the activated and raw sewage sludges conventionally produced in municipal and industrial waste treatment plants. The word activated, as used herein, applies to a sewage sludge resulting from the sequential biological oxidation of raw sewage, which may have been subjected to a primary clarification treatment prior to oxidation, followed by flocculation and settling operations to recover the oxidized organic solids as an underflow sludge. A raw sewage sludge is produced by subjecting a raw sewage stream to a settling operation, with or without previous flocculation of the sewage. The settled raw sewage solids are likewise withdrawn as the underflow from the settling operation.

The anionic polymeric flocculant utilized herein is incorporated into the sludge solids blend in any convenient manner. Once treated with the flocculant, the blended solids are subjected to conditions to effect a solids-liquid separation. In practice, the anionic polymeric flocculant may be incorporated directly into the aqueous sludge blend in the mixing zone or it may be added to any feed stream to the mixing zone. Good results are achieved by incorporating the anionic flocculant into the aqueous washing medium feed stream. Sometimes optimum utilization of the anionic polymeric flocculant is promoted by splitting the flocculant feed among two or more possible addition points.

The anionic polymeric flocculant should be added to the feed streams, or directly into the mixing zone, in the form of a dilute aqueous solution. This solution may contain from as little as about 0.005 up to possibly as much as 5 percent by weight of the dissolved flocculant. Preferably such addition is accomplished with rapid mixing whereby uniform distribution of the flocculant throughout the suspension is accomplished quickly, but without excessive turbulent agitation so as to degrade any flocs which may be forming. Such rapid mixing or blending is effectively accomplished by running all feed streams into a common header conduit. This conduit then discharges into the middle region of a vertical settling tank with means for removing settled solids as an underflow sludge and aqueous elutriate as an overhead stream. The header conduit may be considered as defining a mixing zone for the purposes of the invention. Another mode involves simply discharging all the feed streams into the middle region of such a vertical tank in which region there is provided localized mechanical agitation to effect blending of the streams. In either event, after blending of the sewage sludge solids and polymeric flocculant is accomplished in the presence of the aqueous washing medium, the resulting system is subjected to conditions whereby the sludge solids are settled and the aqueous washing elutriate removed as an overhead from the settling zone.

The polymeric flocculants useful herein are characterized as being water-soluble, anionic organic polymers, i.e., anionic, hydrophilic, organic colloids, which are substantially linear and macromolecular in size. The terminology "water-soluble," as employed in the characterization of the flocculants, means simply dispersible in water to provide a visually homogeneous system infinitely dilutable with water. The term "linear" means substantially free of cross-linking groups between polymer chains. This includes the various forms of homogeneous and block copolymers, with and without branching, as well as homopolymers, of anionic monomers. What is considered macromolecular will vary according to the particular polymer species. The better anionic flocculants have molecular weights of about one million and greater. The preferred high molecular weight, anionic flocculants have weight average molecular weights of at least about 4 million or more and may have molecular weights as great as 15 million.

Specific polymeric flocculants for use in the present invention include the high molecular weight, anionic, water-soluble polyalkanes obtained by the vinyl polymerization of one or more monoethylenically unsaturated monomers bearing a carboxylic or sulfonic acid group, including alkali metal and ammonium salts thereof with the optional inclusion of other monoethylenically unsaturated monomers copolymerizable therewith to provide a water-soluble polymer.

A preferred class of anionic polymeric flocculants for use in accordance with the present invention are the polymers of an alkali metal or ammonium salt of vinyl aromatic sulfonic acid having a weight average molecular weight of about 6 million or more. Such polymers correspond to water-soluble homopolymers of the sulfonate monomers and copolymers thereof prepared by the vinyl polymerization of a major proportion of the vinyl aromatic sulfonate with a minor proportion of a monomer copolymerizable therewith such as acrylamide, methacrylamide, acrylonitrile, styrene, vinyltoluene, methyl acrylate and the like. Such polymers are also obtained by the direct sulfonation of a poly(vinyl aromatic)backbone polymer. A suitable method is described by Turbak in United States Patent 3,072,618. In general, the vinyl aromatic nuclei of the sulfonated polymers are derived from styrene, vinyltoluene and $\alpha$-methyl styrene.

Another variety of anionic polymeric flocculants suitable for use in the present invention is constituted by high molecular weight, water-soluble salts of copolymers of styrene and maleic anhydride. Such copolymers are generally employed in the form of the alkali metal salts thereof, preferably the sodium salt. For best results, such copolymers should have weight average molecular weights of at least about 4,000,000.

Further anionic polymeric flocculants are the water-soluble, substantially linear polymers of high molecular weight, corresponding to the homopolymers of acrylic acid, methacrylic acid, sulfoethyl acrylate, carboxyethyl acrylate, or water-soluble salts of the foregoing anionic monomers, and to copolymers of the acidic monomers, or alkali metal salts thereof, with suitable amounts up to about 95 mole percent of other water-soluble vinyl monomers such as acrylamide and methacrylamide. Additional anionic flocculants suitable for practice of the invention are the cellulose ethers as described in United States Patent 2,728,724, particularly the carboxymethyl cellulose derivatives.

The following examples are illustrative of preferred modes of operation in accordance with the invention. It should be understood, however, the particular conditions utilized in the examples are only representative and intended in no way as limitations on the invention other than as hereinfore set forth.

*Examples*

The following operations were carried out on a laboratory scale. As a conesquence, the elutriation process according to the invention was conducted as a batch process. The necessary modifications to convert such process to a continuous process will be apparent to those skilled in the art.

The digested sewage sludge to be elutriated was obtained from the sewage treatment plant of a small Midwestern city. The solids content of this sludge was 117,698 parts by weight per million parts by weight of sludge.

The solids contents of individual sludges and blends thereof are determined for the purposes herein by filtering a known aliquot of the sludge, or blend of interest, in a Büchner funnel vacuum filter and weighing the filter cake after drying it at 110° C. for 2 hours.

The adidtive non-digested sewage sludge to be mixed with the digested sewage sludge in accordance with the invention was obtained from a second sewage processing plant in the form of an activated sludge containing 8,300 parts of solids per million parts by weight of sludge. Normally, large sewage processing plants have both types of sewage sludges available at a given location. The aqueous washing medium was obtained from the overhead effluent stream of a primary settling clarifier for raw sewage.

The polymeric flocculant utilized was a high molecular weight, water-soluble anionic polymer in the form of a sodium polystyrene sulfonate having a weight average molecular weight of about 6.2 million. The polymer was applied to the system to be flocculated as a 0.05 percent by weight solution in water.

To carry out the elutriation of the digested sludge in accordance with the invention, the aqueous washing medium was premixed with the additive non-digested sewage sludge. Particularly this blend was prepared by mixing together 2,118 milliliters of the activated sludge with 1,382 milliliters of the primary effluent. The solids content of the blended mixture was measured and found to be 5,763 parts of solids per million parts by weight of the mixture. 3,500 milliliters of the above mixture were added to 700 milliliters of the aforementioned digested sewage sludge. This gave a liquid dilution ratio of 5 to 1. The additive non-digested sewage sludge solids comprised 20 percent of the total sludge solids. The resulting admixture was mildly agitated by stirring to accomplish blending of the suspended sewage solids. Subsequently, the blend was divided into four one liter aliquots. Each of three aliquots was treated with a different dosage of the aforementioned polymer solution. Each polymer treated admixture was then stirred with a paddle stirrer at 50 r.p.m. for one minute to accomplish complete dispersion of the polymer throughout the suspension. Thereafter the paddle was rotated at 25 r.p.m. for 30 minutes to promote efficient flocculation of the suspended solids. At this point the stirring was stopped and settling allowed to occur for 30 minutes after which a 100 milliliter sample was taken from the supernatant (overhead elutriate) to ascertain residual suspended solids. It is to be noted that in conventional elutriation operations, where are operated on a continuous process basis, there would be need but for one mixing step to achieve both blending of the sludges and distribution of the polymer.

The results of the foregoing batch elutriation operations with regard to the purity of the overhead elutriate are reported in the following table as Run 1 along with results of a second run involving a similar operation, except that the dilution ratio was doubled. Also included for the purposes of comparison are two runs according to the above general procedure utilizing the same feed streams except that no additive non-digested sludge solids were used. These operations designated Runs 3 and 4 show that, at roughly comparable dilution ratios, the residual suspended solids, both with and without the anionic flocculant treatment, is substantially greater than in the instance when additional non-digested sludge solids were incorporated into the digested sludge to be elutriated. In addition it is apparent that the polymer dosage to achieve effective results is substantially reduced when the additive non-digested sludge is used conjunctively with the anionic polymeric flocculant.

TABLE

| Run No. | Blended Sludge Solids Conc., p.p.m.[1] | Dilution Ratio [2] | Polymer Dose, lb./ton [3] | Overhead Solids Conc., p.p.m.[1] |
|---|---|---|---|---|
| 1 | 21,252 | 5/1 | 0.05 | 603 |
|   | 21,252 | 5/1 | 0.1 | 399 |
|   | 21,252 | 5/1 | 0.25 | 197 |
| 2 | 4,500 | 10/1 | 0.25 | 214 |
|   | 4,500 | 10/1 | 0.5 | 191 |
|   | 4,500 | 10/1 | 1.25 | 234 |
| 3 (compare with Run 1) | 15,000 | 4/1 | 0 | 2,607 |
|   | 15,000 | 4/1 | 0.5 | 795 |
|   | 15,000 | 4/1 | 1.0 | 840 |
| 4 (compare with Run 2) | 6,100 | 12/1 | 1.37 | 663 |
|   | 6,100 | 12/1 | 3.30 | 700 |

[1] Parts by weight of solids per million parts by weight of blend.
[2] This equals the total volume of aqueous liquid represented by the aqueous washing medium and activated sewage sludge divided by the volume of digested sewage sludge. The amount of water added with the polymer was omitted from this ratio. Due to the small amount of polymer used, its effect on the dilution ratio is negligible.
[3] The polymer dosage is specified in terms of pounds per unit weight (ton) of suspended solids.

What is claimed is:

1. In the elutriation of a digested sewage sludge which comprises the steps of feeding a digested sewage sludge to a mixing zone concomitantly with an aqueous washing medium, thereafter settling the resulting washed solids and withdrawing the aqueous washing medium elutriate as an overhead from the settled solids, the improvement which consists in incorporating each of (1) an additive, non-digested sewage sludge and (2) a water-soluble, anionic organic polymeric flocculant into the mixing zone wherein intermixing of the non-digested sewage sludge, polymeric flocculant, digested sewage sludge and washing medium occurs; the rate of incorporating the additive non-digested sewage sludge into the mixing zone being sufficient to provide from about 5 to about 50 percent by weight additional solids based on the weight of the digested sludge solids and the rate of incorporating the organic, anionic polymeric flocculant into the mixing zone being sufficient to enhance the rate at which the resulting blended sludge solids settle.

2. A method as in claim 1 wherein the anionic, organic flocculant is incorporated into the mixing zone in an amount sufficient to provide from about 0.01 to about 10 pounds of polymer per ton of blended sludge solids.

3. A method as in claim 1 wherein the materials fed to the mixing zone achieve a liquid dilution ratio within the range from about 1/1 to about 15/1.

4. A method as in claim 1 wherein the materials fed fed to the mixing zone achieve a liquid dilution ratio within the range from about 1/1 to about 15/1 and the water-soluble, anionic organic polymeric flocculant used is a water-soluble poly(vinyl aromatic) sulfonate having a weight average molecular weight of at least about 4 million.

5. A method as in claim 4 wherein the rate of incorporating the additive non-digested sewage sludge into the mixing zone is sufficient to provide from about 10 to about 30 percent by weight additional solids based on the digested sludge solids and the rate of incorporating the anionic organic, polymeric flocculant into the mixing zone is sufficient to provide from about 0.1 to about 1 pound of the polymer per ton of blended sludge solids.

6. A method as in claim 1 wherein the additive non-digested sewage sludge is incorporated into the mixing zone by adding the same to the digested sewage sludge feed stream and the water-soluble, anionic organic polymeric flocculant is incorporated into the mixing zone by adding the same to the aqueous washing medium feed stream.

References Cited by the Examiner

UNITED STATES PATENTS 3,105,041 9/1963 Genter et al. _____ 210—6
3,142,638 7/1964 Blaisdell et al. _____ 210—52

OTHER REFERENCES

Bargman et al., Sludge Filtration, etc., Sewage and Industrial Waste, vol. 30, September 1958, pp. 1079–1100.

MORRIS O. WOLK, *Primary Examiner.*

MICHAEL ROGERS, *Examiner.*